United States Patent
Smith et al.

(10) Patent No.: US 9,634,792 B2
(45) Date of Patent: Apr. 25, 2017

(54) METHOD AND APPARATUS OF PERFORMING ONT WAVELENGTH TUNING VIA A HEAT SOURCE

(75) Inventors: Joseph L. Smith, Fuquay-Varina, NC (US); Wolfgang W. Pohlmann, Hemmingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 970 days.

(21) Appl. No.: 13/167,380

(22) Filed: Jun. 23, 2011

(65) Prior Publication Data

US 2012/0128373 A1 May 24, 2012

Related U.S. Application Data

(60) Provisional application No. 61/416,859, filed on Nov. 24, 2010.

(51) Int. Cl.
| | | |
|---|---|---|
| *H04B 10/00* | (2013.01) | |
| *H04J 14/02* | (2006.01) | |
| *H04B 10/50* | (2013.01) | |
| *H04B 10/572* | (2013.01) | |

(52) U.S. Cl.
CPC ........ *H04J 14/0282* (2013.01); *H04B 10/503* (2013.01); *H04B 10/572* (2013.01)

(58) Field of Classification Search
USPC ..................................................... 398/66–73
See application file for complete search history.

(56) References Cited

U.S. PATENT DOCUMENTS

| | | | | |
|---|---|---|---|---|
| 5,351,146 A | * | 9/1994 | Chan et al. ..................... | 398/58 |
| 5,774,244 A | * | 6/1998 | Tandon et al. ................. | 398/67 |
| 5,963,350 A | * | 10/1999 | Hill ................................ | 398/70 |
| 7,050,718 B2 | * | 5/2006 | Rychlicki ....................... | 398/57 |
| 7,155,127 B2 | * | 12/2006 | Akimoto et al. .............. | 398/72 |
| 7,280,757 B1 | * | 10/2007 | Britz et al. ..................... | 398/58 |
| 7,493,042 B2 | * | 2/2009 | Li et al. .......................... | 398/68 |
| 7,877,013 B2 | * | 1/2011 | Effenberger ................... | 398/68 |
| 8,041,217 B2 | * | 10/2011 | Bouda ............................ | 398/75 |
| 8,412,044 B2 | * | 4/2013 | Ota et al. ....................... | 398/72 |
| 2003/0138253 A1 | * | 7/2003 | Kim et al. ..................... | 398/69 |
| 2003/0180049 A1 | * | 9/2003 | Park ............................... | 398/72 |
| 2008/0267627 A1 | * | 10/2008 | Effenberger ................... | 398/72 |

FOREIGN PATENT DOCUMENTS

EP 0 810 752 A2 3/1997

\* cited by examiner

*Primary Examiner* — Agustin Bello
(74) *Attorney, Agent, or Firm* — RGIP LLC

(57) ABSTRACT

A method and apparatus of tuning a signal received from a first network terminal at a second network terminal is disclosed. The method may include receiving the signal at the second network terminal. The signal may be operating at a first wavelength. The method may also include determining a port used to receive the signal at the second network terminal, and identifying a predetermined port wavelength used as a basis to shift the first wavelength to the predetermined port wavelength for subsequent signals received. The method may also include transmitting the predetermined port wavelength information to the first network terminal to inform the first network terminal to tune subsequent signals to the desired wavelength for the port.

20 Claims, 6 Drawing Sheets

METHOD AND APPARATUS OF PERFORMING ONT WAVELENGTH TUNING VIA A HEAT SOURCE

CROSS REFERENCE TO RELATED APPLICATIONS

This application claims benefit to provisional application 61/416,859, entitled "Colorless ONT Laser For Cyclic WDM PON Scheme", filed on Nov. 24, 2010, the entire contents of which are hereby incorporated by reference.

TECHNICAL FIELD OF THE INVENTION

This invention relates to a method and apparatus of modifying or tuning frequency/wavelength characteristics of an optical signal, and, in particular, to tuning the laser to a predefined wavelength by utilizing a heat source.

BACKGROUND OF THE INVENTION

In general, different forms of wavelength division multiplexing (WDM) passive optical networks (PONs) face dilemmas with deploying networks utilizing cost effective optical network termination units (ONTs). Fiber optic cabling, termination units and related hardware are expensive and require significant amounts of precision tuning in order to maintain optimal performance.

The ONT, in general, must be configured to operate at a specific wavelength or wavelength group based on a random assignment from the central office equipment. The wavelength assignment scheme may be performed by an optical line terminal (OLT), which assigns the same wavelength to more than one ONT. Alternatively, the assignment scheme may assign one wavelength or a set of wavelengths to a particular group of users, which, in turn, are utilized by a corresponding group of ONTs. PONs require constant configuration and reconfiguration for wide-scale deployment. There is an ongoing challenge to produce color-less laser transmitters in the ONTs of the PONs that are cost effective, while providing flexibility with the wavelength tuning, assignment and adjustment procedure.

When implementing wavelength division multiplexing (WDM) wavelength assignments, the implementation must be planned to accommodate a large number of ONTs. WDM PON systems may not require a single wavelength per end user in the downstream and upstream directions. Within the user access environment, it is necessary to accommodate continuously growing user bandwidth requirements while maintaining a reasonable cost basis.

SUMMARY OF THE INVENTION

One example embodiment of the present invention may include a method of tuning a transmitted signal received from a first network terminal at a second network terminal. The method may include receiving the signal at the second network terminal, the signal operating at a first wavelength, and determining a port used to receive the signal at the second network terminal. The method may also include identifying a predetermined port wavelength used as a basis to shift the first wavelength to the predetermined port wavelength for subsequent signals received. The method may also include transmitting the predetermined port wavelength information to the first network terminal to inform the first network terminal to tune subsequent signals to the desired wavelength for the port.

Another example embodiment of the present invention may include an optical line terminal (OLT) configured to tune a signal received from an optical network terminal (ONT). The OLT may include a receiver configured to receive the signal operating at a first wavelength, and a processor configured to determine a port used to receive the signal, and identify a predetermined port wavelength used as a basis to shift the first wavelength to the predetermined port wavelength for subsequent signals received. The OLT may also include a transmitter configured to transmit the predetermined port wavelength information to the ONT to inform the ONT to tune subsequent signals to the desired wavelength for the port.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Example embodiments of the present invention may provide implementing a wavelength division multiplexing (WDM) communication system with a tunable wavelength transmitter/receiver. When operating a PON communication system, one approach to maintaining a reasonable cost structure may include allocating a single wavelength or a group of wavelengths to a particular group of users. The overall bandwidth efficiency may increase as a result of a number of users sharing the same wavelength or wavelength group.

Figure 1:
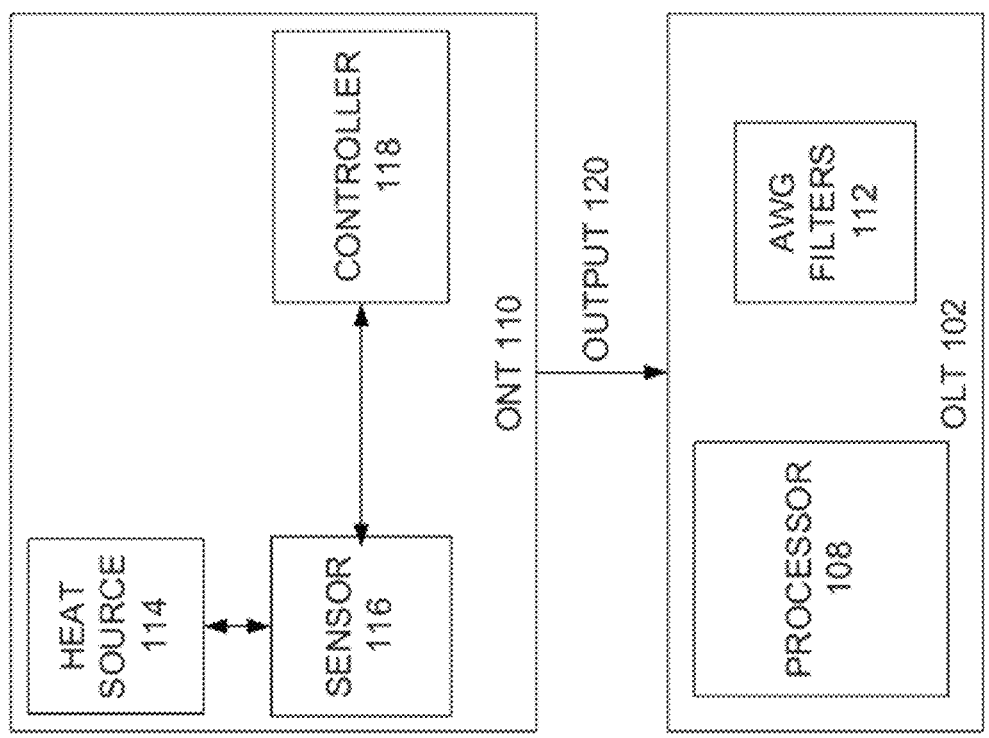
FIG. 1 illustrates an example ONT system, according to example embodiments of the present invention.

FIG. 1 illustrates an example OLT and ONT system configuration, according to example embodiments of the present invention. Referring to FIG. 1, an OLT 102 may be located at a central office and may include an arrayed waveguide grating (AWG) filters 112 and a processor 108. Specifically, the AWG filters 112 are cyclic AWG filters. The OLT 102 may be connected to the remote ONT 110, or may be in communication with the remote ONT 110, which includes an ONT laser device.

The ONT laser device may have a tunable laser that includes a heat source 114, sensor 116 and controller 118. The output 120 is a laser signal that has been modified by the heat source 114 to operate at a particular wavelength. The ONT 110 also includes a sensor 116 and a controller 118. In operation, the signal present from the ONT at the AWG filters 112 may detect a needed temperature adjustment of the ONT laser device and transmit a control signal to the ONT laser device of the ONT 110. The control signal may be used to activate the heat source 114. The sensor 116 provides feedback regarding the temperature of the ONT laser device, which is part of ONT 110 and provides that feedback to the controller 118, which is also part of ONT 110. The controller 118 may then increase the amount of heat applied to the surface of the laser transmitter of ONT 110, or, reduce the amount of heat if the temperature is higher than necessary to modify the wavelength of the present signal. The amount of heat applied is based on a predefined amount of heat needed to tune the wavelength of the ONT laser device. The amount of heat may be defined in a table used to correlate with the tuning of the desired wavelength of the signal, which is stored in memory (not shown).

According to another example embodiment of the present invention, the sensor and heater may be integrated into the laser die via a semiconductor fabrication procedure. Such a laser die configuration may reduce the thermal mass and time lag required for sensing and controlling the laser's wavelength tuning.

The tuning of the laser device wavelength may be performed by the heat source 114. The AWG filter 112 may operate independently of the heat source 114. The laser signal 120 may be tuned to fit the predefined AWG signal passbands. At the OLT side 102, the receiver may process a fast relative received signal strength (RSSI) indication. The RSSI is an indication of the power level being received by the receiver. The RSSI may provide a control signal that is proportional to a received burst amplitude. The AWG filter(s) 112 is a fixed wavelength device. The heat source 114 must be able to tune to the predefined passbands defined by the AWG filter(s) 112. This is performed by having the AWG filters 112 detect RSSI values and drifts, and communicate offset values to the ONT 110 for correction. This enables the signals detected at the AWG filters 112 of the OLT 102 to be monitored and in turn used to control the heat source 114 of the ONT 110.

Continuing with the tuning example, if the AWG passband has, for example, a Gaussian-curve shape, the passband has a minimum insertion loss at the center of curve. Therefore, a burst in the center will receive the highest signal amplitude. Furthermore, dithering the wavelength can provide a way to adjust the signal to the center of the passband.

One example may include utilizing a cyclical AWG filter(s) 112 at the OLT 102 to select different laser wavelengths. By determining an ONT's laser is currently operating on the wrong output of the cyclic AWG 112, the OLT 102 can then send a command to tune a laser wavelength of the ONT within a group of predefined desired wavelengths.

The predefined wavelengths may be evenly spaced apart within a predefined frequency range assigned to a corresponding wavelength group. In operation, the cyclic AWG filter 112 cycles through its outputs based on certain groups of incoming wavelengths. The AWG filter 112 may transmit a control signal to the heat source 114 to tune the laser wavelength to the next appropriate wavelength of the wavelength group for the intended output 120.

A wavelength adjustment or tuning may be required prior to transmitting a data signal to a particular end user. The ONT laser can be tuned by the heat source 114 alone, rather than by using a heating and cooling device, such as, a thermo-electric cooler (TEC). Using only heating significantly decreases the electrical and thermal requirements of the laser wavelength tuner configuration, and provides a more cost effective approach than a heating and cooling system. For a WDM PON that utilizes a cyclic AWG filter to assign wavelengths to certain wavelength groups, the ONT laser is able to tune to the wavelengths included in these wavelength groups via heat-only. The combination of the AWG filter 112 and the heat source 114 provides an effective heat-only environment for wavelength tuning.

Figure 2A:
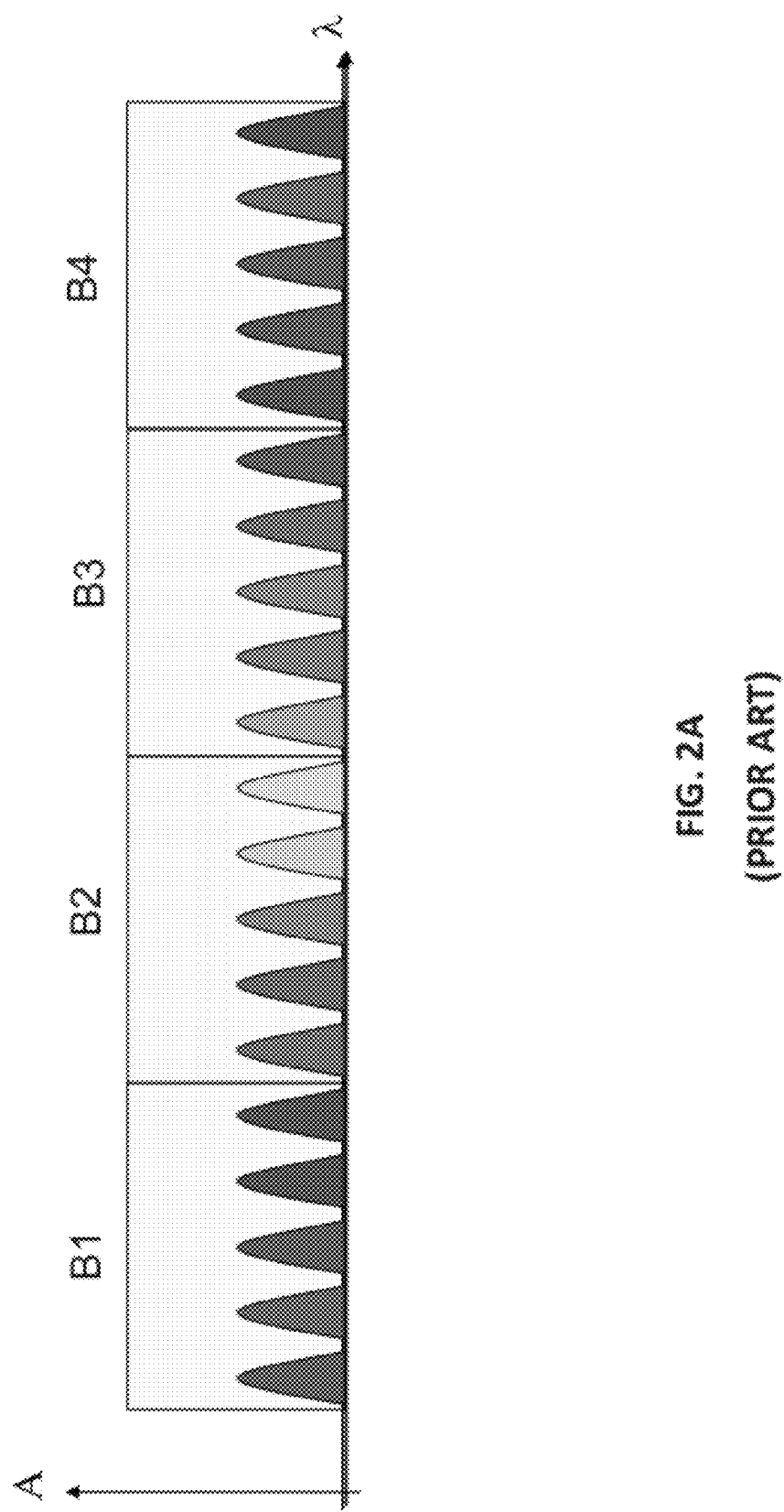
FIG. 2A illustrates an example wavelength group, according to a conventional approach to wavelength tuning.

FIG. 2A illustrates a group of wavelength bands according to a conventional approach to tuning wavelength sub-bands. Referring to FIG. 2A, four wavelength sub-bands B1, B2, B3 and B4 are illustrated as having five unique wavelengths per sub-band. By implementing a distributed feedback (DFB) laser, an optical signal's wavelength can be tuned by heating or cooling by approximately 0.08 nm/° K. Assuming 20° Kelvin is possible for tuning, this approach provides a 1.6 nm tuning range for a conventional DFB. Some amount of temperature control is required to tune the laser wavelength to the pass-band of the filter. However this conventional approach is not sufficient to tune over 4 wavelength sub-bands (20 nm).

Figure 2B:
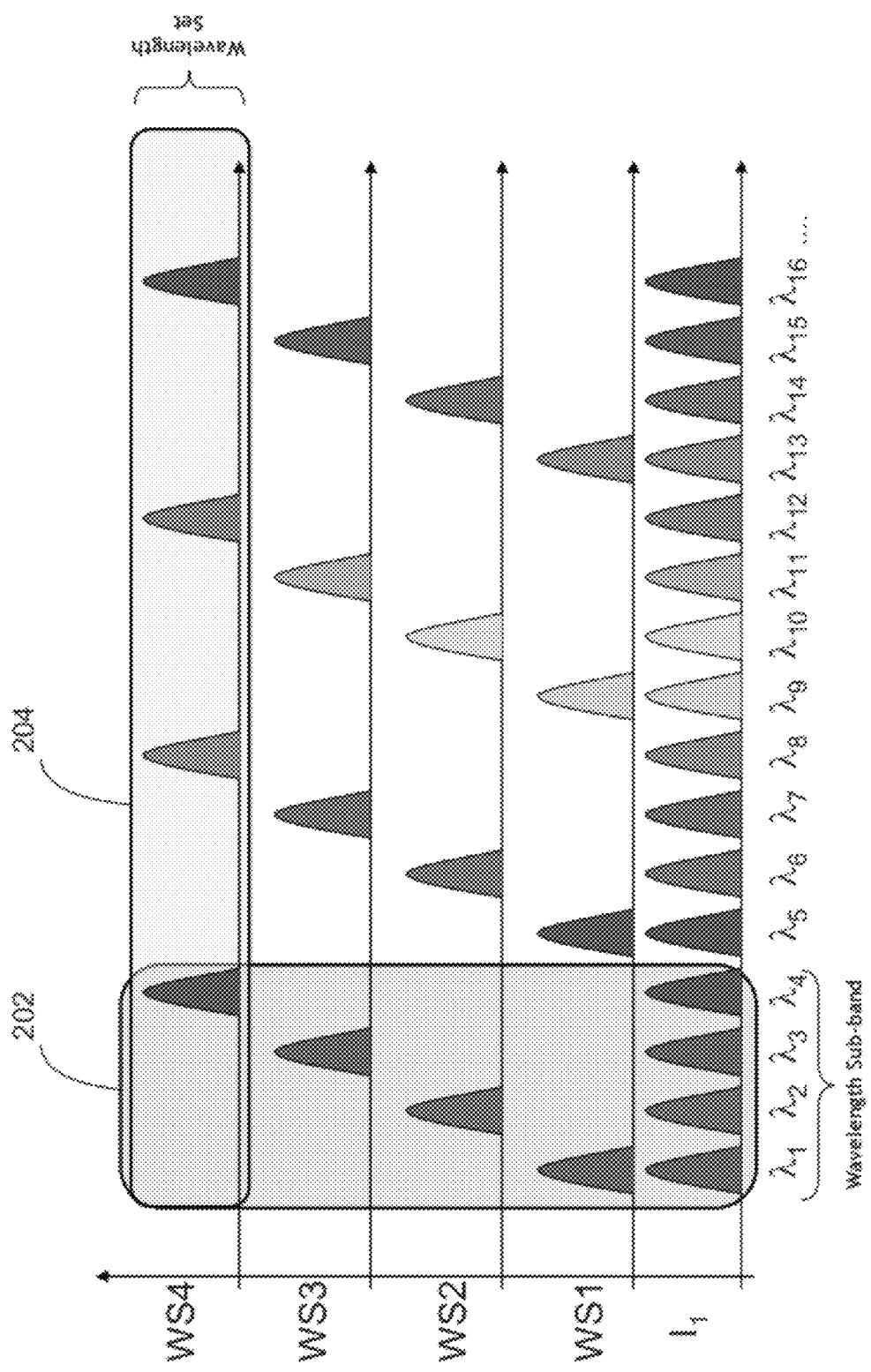
FIG. 2B illustrates an example wavelength group, according to example embodiments of the present invention.

FIG. 2B illustrates a group of wavelength bands according to an example embodiment of the present invention. Referring to FIG. 2B, a wavelength sub-band 202 is illustrated as having four different wavelengths or frequencies $\lambda_1$, $\lambda_2$, $\lambda_3$ and $\lambda_4$. Each of the four wavelengths is part of a different wavelength set 204, which also includes four wavelengths. In the wavelength sets WS1, WS2, WS3 and WS4, each set includes one wavelength from each wavelength sub-band.

Tuning from one wavelength in a particular wavelength set to another in the same set may be performed by applying heat only. According to one example, heat may be applied to tune between wavelengths. For example, a laser may be tuned to a particular wavelength that is between two of the optical wavelengths required by the ONT 110 and/or OLT 102. By applying heat to the laser, the wavelength may adjust to a discrete wavelength that is recognized by the optical system.

In another example, the external temperature may cause the operating wavelength to shift away from a particular operating wavelength. For instance, a first or current operating wavelength may be $\lambda_7$ of WS3. The laser may be currently operating at $\lambda_7$ of WS3, however, an increase in the external temperature may cause the laser's wavelength to shift upwards towards $\lambda_8$ or $\lambda_9$. In this case, it may be desirable to continue operating within the predefined wavelengths of the same wavelength set WS3. As a result, the optical laser may apply heat via the embedded heat source in the laser die or via an external heat source affixed to the laser device. The heat may be controlled to only modify the present wavelength to the next wavelength $\lambda_{11}$ in the wavelength set WS3.

Figure 3:
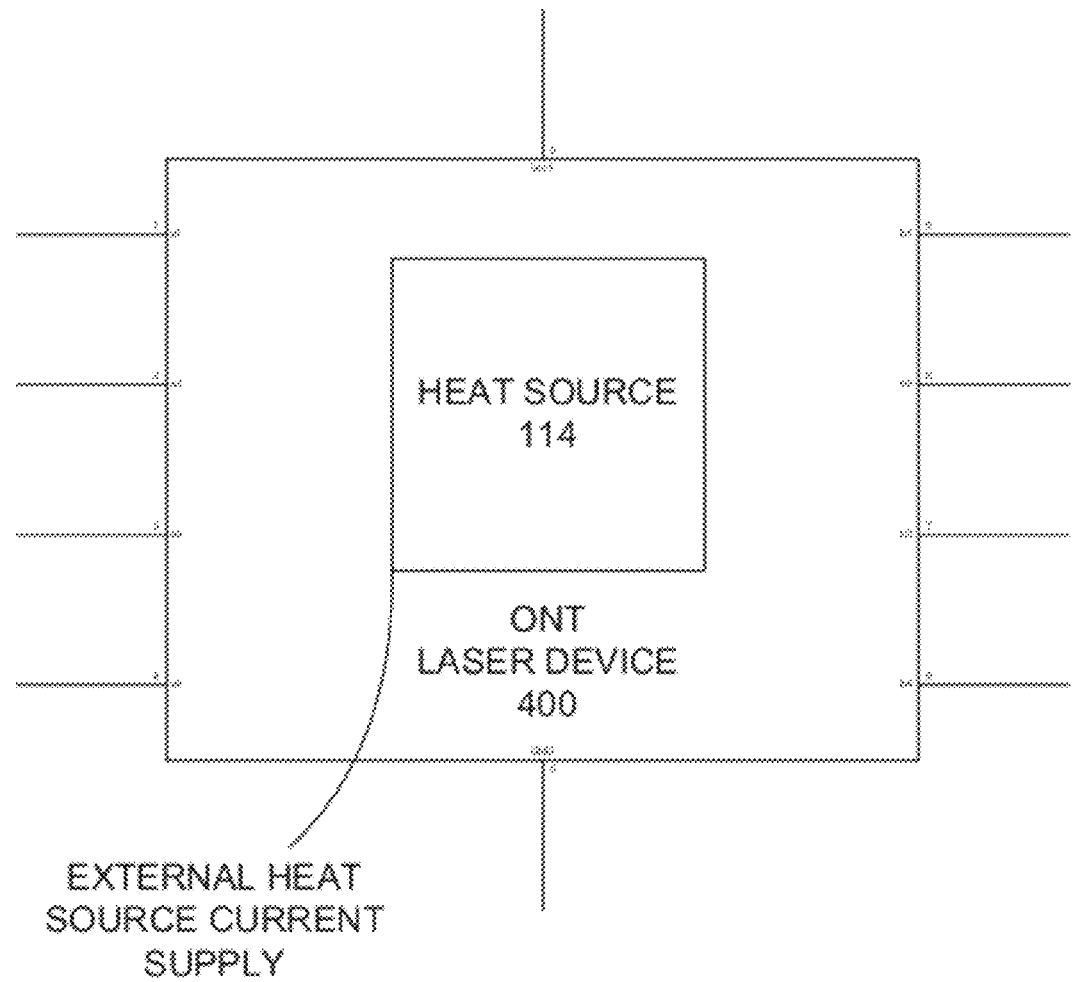
FIG. 3 illustrates an example ONT die device, according to example embodiments of the present invention.

FIG. 3 illustrates an example laser die, according to example embodiments of the present invention. Referring to FIG. 3, the laser structure can be modified to add a "heater layer" in the laser epitaxial structure, or as a metal strip on the top of the ONT laser device 400. The epitaxial structure may be a transistor made by depositing a thin pure layer of semiconductor material (epitaxial layer) onto a crystalline support by epitaxy. The thin layer may act as one of the electrode regions, such as, the collector. The heater may also be resistor or metal structure. The heater may also be a layer above under or on the side of the laser device 400.

As illustrated in FIG. 3, the heat source 114 may instead be a metal layer added externally to the laser die with a floating heat source external to the die chip. This heater layer is capable of providing a small amount of heat, which is enough to adjust the wavelength of the laser by approximately 1-2 nm. The heat may be just large enough to move or shift the actual wavelength within one wavelength assignment of a desired 10, 12, 16, etc., wavelength group, based on 50 GHz wavelength spacing. Additionally, in order to control cost and maintain fast thermal response, a PIN or PN junction can also be included in a laser die of the laser to provide temperature monitoring in the same chip as the laser itself, allowing for ideally matched profiles. A controller may provide a temperature regulator for increasing, decreasing and/or cutting-off the amount of current supplied to the heat source 114.

By providing both the heater and the temperature sensor in the same laser die, or chip, the overall thermal mass of the laser is reduced, facilitating quick thermal response time and lower electrical power requirements for temperature control. Additionally, since the laser, heater, and the temperature sensor are all included in the same die, or chip, the impact on cost of a TOCAN assembled laser is low. This configuration provides a low time constant on the order of microseconds.

The heat source 114 is capable of providing a small amount of heat, which is enough to adjust the wavelength of the laser by approximately 1-2 nm. On the laser die chip of FIG. 3, an additional layer includes the heat source 114 which is used for heating. The heat sensor being laid on top of the chip will not increase the size of the chip. One wavelength assignment in a group of wavelengths may be part of a group of ten different wavelengths based on 50 GHz wavelength spacing. In order to maintain fast thermal response, a PIN or PN junction can also be included in the laser die to provide temperature monitoring in the same chip as the laser itself, allowing for ideally matched profiles.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent any of the above-described components of the previous drawings.

Figure 4:
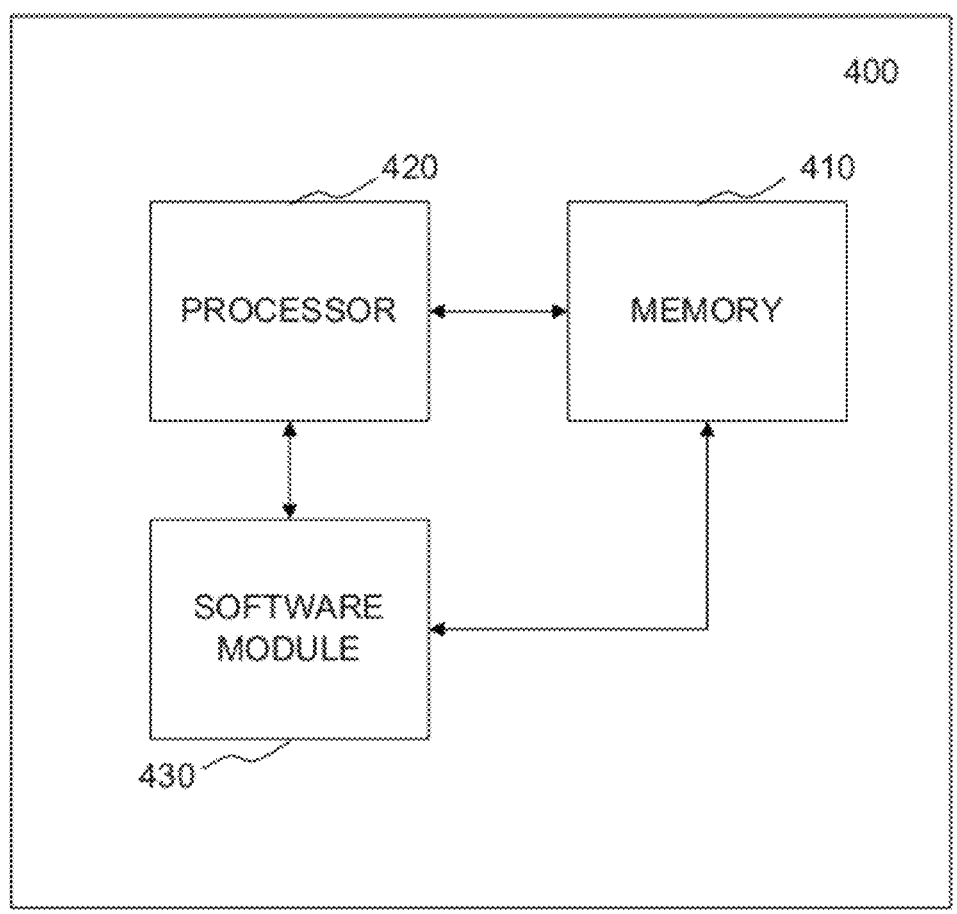
FIG. 4 illustrates an example network entity configured to perform the operations of the present invention, according to example embodiments of the present invention.
Figure 5:
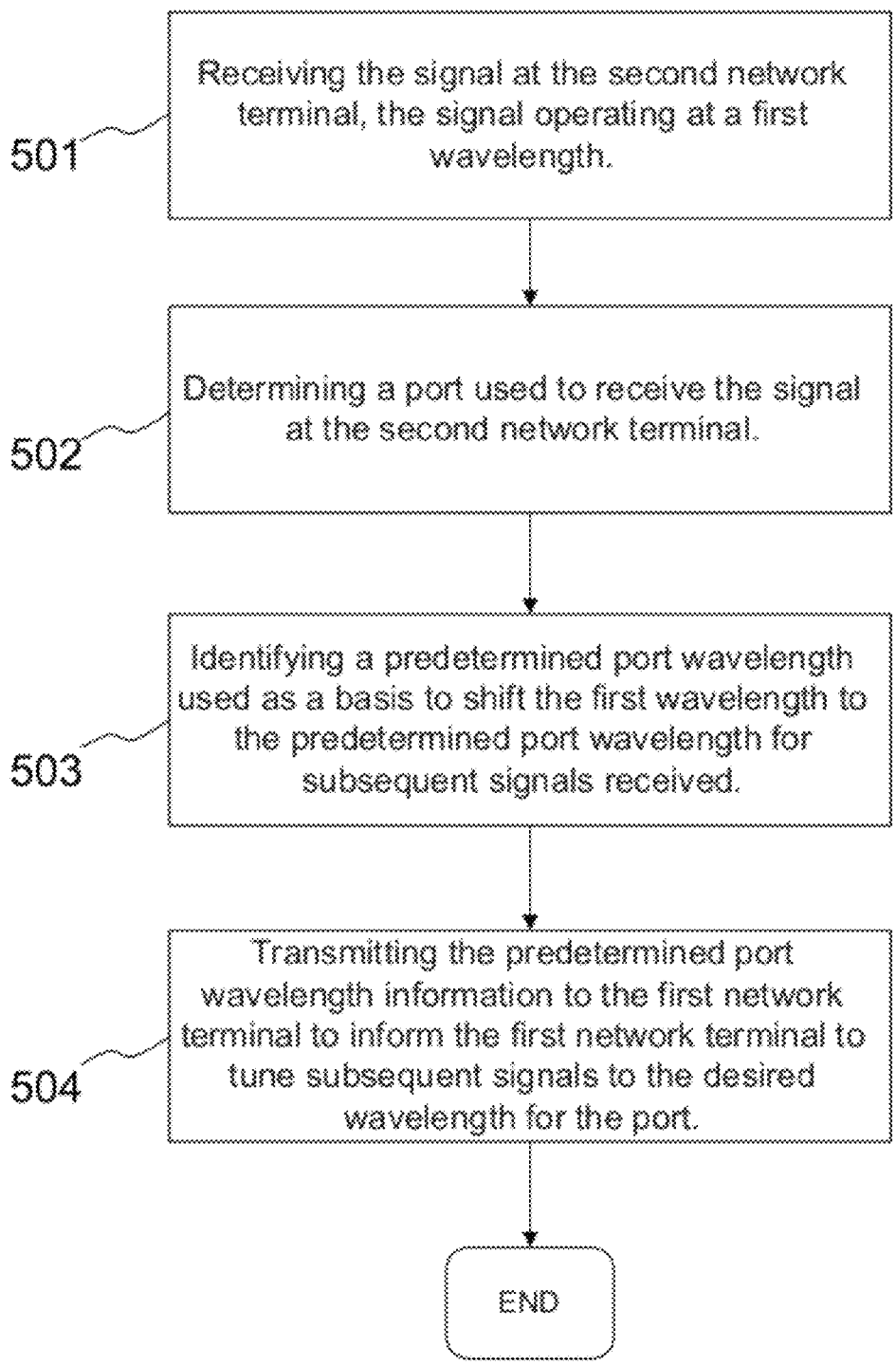
FIG. 5 is a flow diagram of an example method of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. The computer readable medium may be a non-transitory computer readable medium that includes tangible hardware components in addition to software stored in memory. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

An example method of modifying a first signal is disclosed. The method may include tuning a signal received from a first network terminal at a second network terminal. The method provides receiving the signal at the second network terminal, the signal operating at a first wavelength, at operation 501. The method may also include determining a port used to receive the signal at the second network terminal, at operation 502. The method may further include identifying a predetermined port wavelength used as a basis to shift the first wavelength to the predetermined port wavelength for subsequent signals received, at operation 503. The method may also include transmitting the predetermined port wavelength information to the first network terminal to inform the first network terminal to tune subsequent signals to the desired wavelength for the port, at operation 504.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of tuning a transmitted signal received from a first network terminal at a second network terminal, the method comprising:
   receiving the signal at the second network terminal, the signal operating at a first wavelength;
   determining a port used to receive the signal at the second network terminal;
   identifying a predetermined port wavelength used as a basis to shift the first wavelength to the predetermined port wavelength for subsequent signals received;
   transmitting the predetermined port wavelength information to the first network terminal to inform the first network terminal to tune subsequent signals to a desired wavelength for the port, wherein the predetermined port wavelength is selected from a group of predefined wavelengths; and
   transmitting a control signal to a heat source to tune the predetermined port wavelength to a next wavelength of the group of predefined wavelengths, wherein the next wavelength is different from the first wavelength.

2. The method of claim 1, wherein the predetermined port wavelength information is determined via a cyclic arrayed waveguide grating (AWG) filter.

3. The method of claim 1, wherein the signal is an optical signal.

4. The method of claim 3, wherein the first network terminal is an optical network terminal (ONT) and the second network terminal is an optical line terminal (OLT).

5. The method of claim 1, wherein responsive to receiving the predetermined port wavelength information, the first network terminal performs:
applying the heat source to a transmitter to modify the first wavelength for subsequent signal transmissions;
generating a second signal having a second wavelength equal to the next wavelength, which is different from the first wavelength based on the heat applied from the heat source; and
transmitting the second signal.

6. The method of claim 5, wherein applying the heat source comprises applying a predefined amount of heat corresponding to a target wavelength used as a basis to modify the first wavelength and create the second signal having the second wavelength.

7. The method of claim 6, further comprising:
sensing the amount of heat supplied by the heat source and providing feedback to a controller; and
modifying the amount of heat supplied to the transmitter to tune the second wavelength of the second signal.

8. An optical line terminal (OLT) configured to tune a signal received from an optical network terminal (ONT), the OLT comprising:
a receiver configured to receive the signal operating at a first wavelength;
a processor configured to determine a port used to receive the signal, and identify a predetermined port wavelength used as a basis to shift the first wavelength to the predetermined port wavelength for subsequent signals received; and
a transmitter configured to transmit the predetermined port wavelength information to the ONT to inform the ONT to tune subsequent signals to a desired wavelength for the port, wherein the predetermined port wavelength is selected from a group of predefined wavelengths, and the transmitter is also configured to transmit a control signal to a heat source to tune the predetermined port wavelength to a next wavelength of the group of predefined wavelengths, wherein the next wavelength is different from the first wavelength.

9. The OLT of claim 8, wherein the predetermined port wavelength information is determined via a cyclic arrayed waveguide grating (AWG) filter.

10. The OLT of claim 8, wherein the signal is an optical signal.

11. The OLT of claim 8, wherein responsive to receiving the predetermined port wavelength information, the ONT performs:
applies the heat source to the transmitter to modify the first wavelength for subsequent signal transmissions,
generates a second signal having a second wavelength equal to the next wavelength, which is different from the first wavelength based on the heat applied from the heat source, and
transmits the second signal to the OLT; and
the OLT receives the second signal operating at the second wavelength at the port.

12. The OLT of claim 11, wherein applying the heat source comprises applying a predefined amount of heat corresponding to a target wavelength used as a basis to modify the first wavelength and create the second signal having the second wavelength.

13. The OLT of claim 12, further comprising:
sensing the amount of heat supplied by the heat source and providing feedback to a controller; and
modifying the amount of heat supplied to the transmitter to tune the second wavelength of the second signal.

14. A non-transitory computer readable storage medium configured to store instructions that when executed cause a processor to perform tuning a signal received from a first network terminal at a second network terminal, the processor being further configured to perform:
receiving the signal at the second network terminal, the signal operating at a first wavelength;
determining a port used to receive the signal at the second network terminal;
identifying a predetermined port wavelength used as a basis to shift the first wavelength to the predetermined port wavelength for subsequent signals received;
transmitting the predetermined port wavelength information to the first network terminal to inform the first network terminal to tune subsequent signals to a desired wavelength for the port, wherein the predetermined port wavelength is selected from a group of predefined wavelengths; and
transmitting a control signal to a heat source to tune the predetermined port wavelength to a next wavelength of the group of predefined wavelengths, wherein the next wavelength is different from the first wavelength.

15. The non-transitory computer readable storage medium of claim 14, wherein the predetermined port wavelength information is determined via a cyclic arrayed waveguide grating (AWG) filter.

16. The non-transitory computer readable storage medium of claim 14, wherein the signal is an optical signal.

17. The non-transitory computer readable storage medium of claim 16, wherein the first network terminal is an optical network terminal (ONT) and the second network terminal is an optical line terminal (OLT).

18. The non-transitory computer readable storage medium of claim 14, wherein responsive to receiving the predetermined port wavelength information, the first network terminal performs:
applying the heat source to a transmitter to modify the first wavelength for subsequent signal transmissions;
generating a second signal having a second wavelength equal to the next wavelength, which is different from the first wavelength based on the heat applied from the heat source; and
transmitting the second signal.

19. The non-transitory computer readable storage medium of claim 18, wherein applying the heat source comprises applying a predefined amount of heat corresponding to a target wavelength used as a basis to modify the first wavelength and create the second signal having the second wavelength.

20. The non-transitory computer readable storage medium of claim 19, further comprising:
sensing the amount of heat supplied by the heat source and providing feedback to a controller; and
modifying the amount of heat supplied to the transmitter to tune the second wavelength of the second signal.

* * * * *